United States Patent
Hamburg et al.

(10) Patent No.: US 12,500,738 B2
(45) Date of Patent: Dec. 16, 2025

(54) PROTECTION OF CRYPTOGRAPHIC SUBSTITUTION-PERMUTATION NETWORKS FROM FAULT INJECTION ATTACKS

(71) Applicant: Cryptography Research, Inc., San Jose, CA (US)

(72) Inventors: Michael Alexander Hamburg, Laguna Beach, CA (US); Helena Handschuh, Palo Alto, CA (US); Mark Evan Marson, Carlsbad, CA (US); Winthrop John Wu, Pleasanton, CA (US)

(73) Assignee: Cryptography Research, Inc., San Jose, CA (US)

( * ) Notice: Subject to any disclaimer, the term of this patent is extended or adjusted under 35 U.S.C. 154(b) by 541 days.

(21) Appl. No.: 17/948,017

(22) Filed: Sep. 19, 2022

(65) Prior Publication Data

US 2023/0093306 A1     Mar. 23, 2023

Related U.S. Application Data (60) Provisional application No. 63/261,396, filed on Sep. 20, 2021.

(51) Int. Cl.
 *H04L 9/06*              (2006.01)
(52) U.S. Cl.
 CPC ................... *H04L 9/0631* (2013.01)
(58) Field of Classification Search
 CPC .. H04L 9/0631; H04L 9/004; H04L 2209/046
 See application file for complete search history.

(56) References Cited

U.S. PATENT DOCUMENTS

| | | | |
|---|---|---|---|
| 8,565,421 B1 | 10/2013 | Bhooma | |
| 9,509,495 B2 | 11/2016 | Lee et al. | |
| 9,565,018 B2 | 2/2017 | Farrugia et al. | |
| 2008/0253557 A1* | 10/2008 | Dottax | H04L 9/002 380/28 |
| 2014/0348323 A1* | 11/2014 | Chevallier-Mames | H04L 9/0631 380/28 |
| 2016/0269175 A1* | 9/2016 | Cammarota | H04L 9/002 |
| 2018/0097618 A1* | 4/2018 | Kumar | H03K 19/215 |
| 2019/0305930 A1 | 10/2019 | Bauer | |
| 2021/0391977 A1* | 12/2021 | Reymond | G09C 1/00 |

OTHER PUBLICATIONS

Chou et al. Title: ": A High Performance, Low Energy, Compact Masked 128-Bit AES in 22nm CMOS Technology", Date: 2019; Published in: 2019 International Symposium on VLSI Design, Automation and Test (VLSI-DAT) (2019, pp. 1-4) (Year: 2019).*

* cited by examiner

*Primary Examiner* — Farid Homayounmehr
*Assistant Examiner* — Suman Debnath
(74) *Attorney, Agent, or Firm* — Lowenstein Sandler LLP (57) ABSTRACT

Aspects of the present disclosure involve a method and a system to perform the method to obtain a cryptographic output of a plurality of rounds of a cipher, by performing a plurality of modified rounds of the cipher, each of the modified rounds computing an unmasking transform, an operation of a respective round of the cipher, and a masking transform, the unmasking transform being an inverse of the masking transform of a previous round of the cipher.

21 Claims, 6 Drawing Sheets

PROTECTION OF CRYPTOGRAPHIC SUBSTITUTION-PERMUTATION NETWORKS FROM FAULT INJECTION ATTACKS

RELATED APPLICATIONS

This application claims the benefit of U.S. Provisional Patent Application No. 63/261,396, filed Sep. 20, 2021, which is hereby incorporated herein by reference.

TECHNICAL FIELD

The disclosure pertains to cryptographic computing applications, more specifically to protecting cryptographic applications, such as substitution-permutation networks, from fault-injection attacks.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to protection of cryptographic engines against adversarial attacks, including but not limited to fault injection attacks. More specifically, aspects of the present disclosure are directed to preventing an adversary from inducing an incorrect operation in a cryptographic engine and successfully determining secret data based on the output of the induced operation. Cryptographic engines operating in accordance with aspects of the present disclosure perform computations that use obfuscated inputs and cryptographic keys. As a result, when operations of the cryptographic engine are prematurely interrupted by an adversarial attack, the data output by the cryptographic engine and obtained by the attacker is obfuscated and does not reveal the secret data (e.g., cryptographic keys).

Fault injection techniques are commonly used by adversarial attackers to extract keys and other sensitive data from cryptographic engines and other devices. During a fault injection, an attacker induces a software or a hardware fault in a system and exploits vulnerabilities of the state of the faulted system to access secret data. For example, a cryptographic engine may be executing a multi-round algorithm that is configured to process a secret message (e.g., a plaintext) together with a cryptographic key and produce an output (e.g., ciphertext) that can be safely published without revealing the underlying plaintext and the key. The output ciphertext, however, may be safe after all (or most of) the rounds of computations are completed but may be less safe if only a small number of rounds has been performed. Accordingly, an attacker may use an external signal, such as a voltage surge, an optical signal, or some other combination of possible influences, to alter a state or operations of a round counter, a comparator, a clock, or some other device, routine, or a process, to cause the cryptographic engine (or cryptographic software) to prematurely cease the computations. Based on the data output by the cryptographic engine (which may be accessible to the attacker) after only one (or a few) rounds or computations, the attacker may be capable of deciphering the input keys or secret data using techniques of cryptanalysis.

For example, the 128-bit, 192-bit, or 256-bit Advanced Encryption Standard (AES) is commonly used to protect secret data. AES uses 10, 12, or 14 rounds of computations, respectively. AES is one example of a block cipher algorithm that uses a series of linked mathematical operations known as a substitution-permutation network (SPN). Other examples include 3-Way, Kalyna, Kuznyechik, PRESENT, SAFER, SHARK, Square, and other networks. SPN algorithms typically operate on input data x which is processed by N rounds of operations, each round performing a set of computations $R_j$, which can be the same or different computations. The computations can be performed by the same set of hardware circuits or software modules. More specifically, after j rounds, the intermediate output is $x_j = R_j° \ldots °R_1°x$. After completion of all N rounds, the output $x_N = R_N° \ldots °R_1°X$ may be a strong cryptographic number (ciphertext) that is resistant to cryptanalysis. On the other hand, a fault injection that causes the SPN to stop computations may return an early output $x_1 = R_1°X$ (or $x_2 = R_2°x_1$, etc.) that is still cryptographically weak and vulnerable to cryptanalysis, which can then identify x and/or a cryptographic key used in computing $x_1$ (or $x_2$, etc.).

For brevity and conciseness, various implementations of the disclosure are illustrated with references to SPN, but it should be understood that similar techniques may be used for protection of intermediate outputs of any cryptographic applications that perform multiple iterations of looped rounds of computations. In some implementations of this disclosure, one or more obfuscation transformations may be applied during a round of computations of an SPN. For example, prior to the first round, the input data may be obfuscated by a transform $T_0$ that is invertible and is based on one or more random numbers: $x_0 = T_0(x)$. For example, a block input x into the SPN may be a 4×4 matrix of 8-bit numbers. The obfuscated input $x_0$ may be a different 4×4 matrix of 8-bit numbers. During performance of the first round of SPN computations, the cryptographic engine may apply an operations transformation that amounts to (e.g., is a composite operation of) i) the inverse transform $T_0^{-1}$ (such that $T_0^{-1}(T_0(x)) = x$), ii) first round SPN operations $R_1$, and iii) another obfuscation transform $T_1$: $x_1 = T_1°R_1°T_0^{-1}x_0$. For additional protection, the transform $T_1$ may be different from transform $T_0$ and may also be based on one or more random numbers. As a result, the obfuscated output $x_1$ is different from an intended output of the first round by the transform $T_1$, which is not known to the attacker. This process can be repeated, with the cryptographic engine computing the operation $x_j = T_j °R_j °T_{j-1}^{-1} x_{j-1}$ during j-th round. During the last N-th round, the final transform may be an identity transform, $T_N=1$, since the output of the last round is a cryptographically strong number. The final output of the SPN network $x_N = R_N° \ldots °R_1°x$ is, therefore, the correct ciphertext value. In some implementations, the output of the last round of the SPN may be different from the correct ciphertext value, if $T_N \neq 1$, with an additional transform $T_N^{-1}$ applied to $x_N$ to obtain the ciphertext.

Various implementations and modifications of SPN protection against fault attacks are described below. The advantages of the disclosed implementations include but are not limited to an enhanced protection of secret data (e.g., plaintext messages and cryptographic keys) in the instances where a cryptographic SPN is forced to interrupt processing (or follow an incorrect processing path) and to output data that, in conventional systems and algorithms, would be insufficiently protected.

Figure 1:
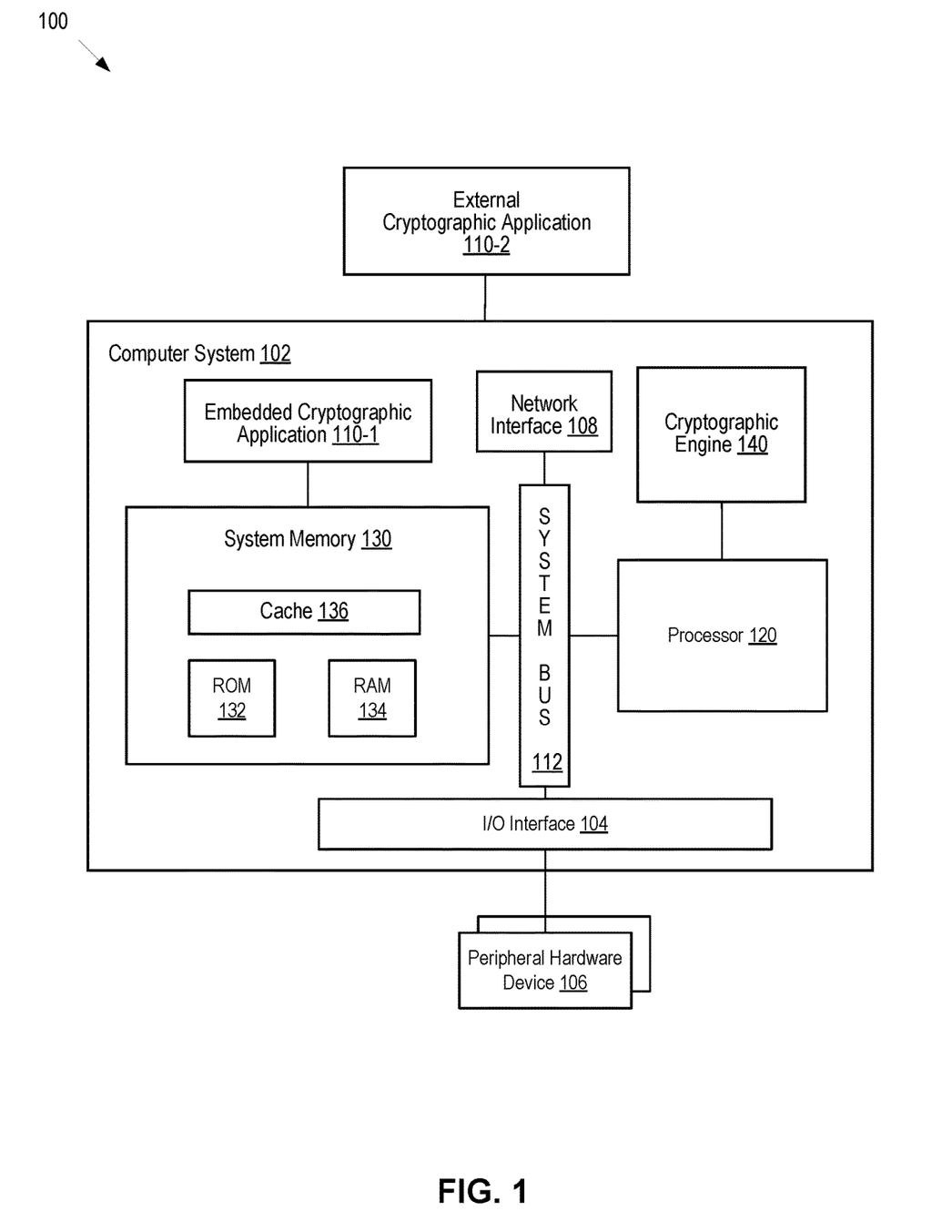
FIG. 1 is a block diagram illustrating an example system architecture in which implementations of the present disclosure may operate.

FIG. 1 is a block diagram illustrating an example system architecture 100 in which implementations of the present disclosure may operate. The example system architecture 100 may be a desktop computer, a tablet, a smartphone, a server (local or remote), a thin/lean client, and the like. The example system architecture 100 may be a smart a card reader, a wireless sensor node, an embedded system dedicated to one or more specific applications (e.g., cryptographic applications 110-1 and 110-2), and so on. The system architecture 100 may include, but need not be limited to, a computer system 102 having one or more processors 120, e.g., central processing units (CPUs), capable of executing binary instructions, and one or more memory devices 130. "Processor" refers to a device capable of executing instructions encoding arithmetic, logical, or I/O operations. In one illustrative example, a processor may follow Von Neumann architectural model and may include one or more arithmetic logic units (ALUs), a control unit, and a plurality of registers.

The system architecture 100 may further include an input/output (I/O) interface 104 to facilitate connection of the computer system 102 to peripheral hardware devices 106 such as card readers, terminals, printers, scanners, internet-of-things devices, and the like. The system architecture 100 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from the computer system 102. Various hardware components of the computer system 102 may be connected via a system bus 112 that may include its own logic circuits, e.g., a bus interface logic unit (not shown).

The computer system 102 may support one or more cryptographic applications 110-n, such as an embedded cryptographic application 110-1 and/or external cryptographic application 110-2. The cryptographic applications 110-n may be secure authentication applications, encrypting applications, decrypting applications, secure storage applications, and so on. The external cryptographic application 110-2 may be instantiated on the same computer system 102, e.g., by an operating system executed by the processor 120 and residing in the memory device 130. Alternatively, the external cryptographic application 110-2 may be instantiated by a guest operating system supported by a virtual machine monitor (hypervisor) executed by the processor 120. In some implementations, the external cryptographic application 110-2 may reside on a remote access client device or a remote server (not shown), with the computer system 102 providing cryptographic support for the client device and/or the remote server.

The processor 120 may include one or more processor cores having access to a single or multi-level cache and one or more hardware registers. In implementations, each processor core may execute instructions to run a number of hardware threads, also known as logical processors. Various logical processors (or processor cores) may be assigned to one or more cryptographic applications 110, although more than one processor core (or a logical processor) may be assigned to a single cryptographic application for parallel processing. A multi-core processor 120 may simultaneously execute multiple instructions. A single core processor 120 may typically execute one instruction at a time (or process a single pipeline of instructions). The processor 120 may be implemented as a single integrated circuit, two or more integrated circuits, or may be a component of a multi-chip module.

The memory device 130 may refer to a volatile or non-volatile memory and may include a read-only memory (ROM) 132, a random-access memory (RAM) 134, high-speed cache 136, as well as (not shown) electrically erasable programmable read-only memory (EEPROM), flash memory, flip-flop memory, or any other device capable of storing data. The RAM 134 may be a dynamic random-access memory (DRAM), synchronous DRAM (SDRAM), a static memory, such as static random-access memory (SRAM), and the like. Some of the cache 136 may be implemented as part of the hardware registers of the processor 120 In some implementations, the processor 120 and the memory device 130 may be implemented as a single field-programmable gate array (FPGA).

The computer system 102 may include a cryptographic engine 1400 for fast and efficient performance of cryptographic computations, as described in more detail below. Cryptographic engine 140 may include processing and memory components that are different from processor 120 and system memory 130. Cryptographic engine 140 may perform authentication of applications, users, access requests, in association with operations of the cryptographic applications 110-n or any other applications operating on or in conjunction with the computer system 102. Cryptographic engine 140 may further perform encryption and decryption of secret data.

Figure 2A:
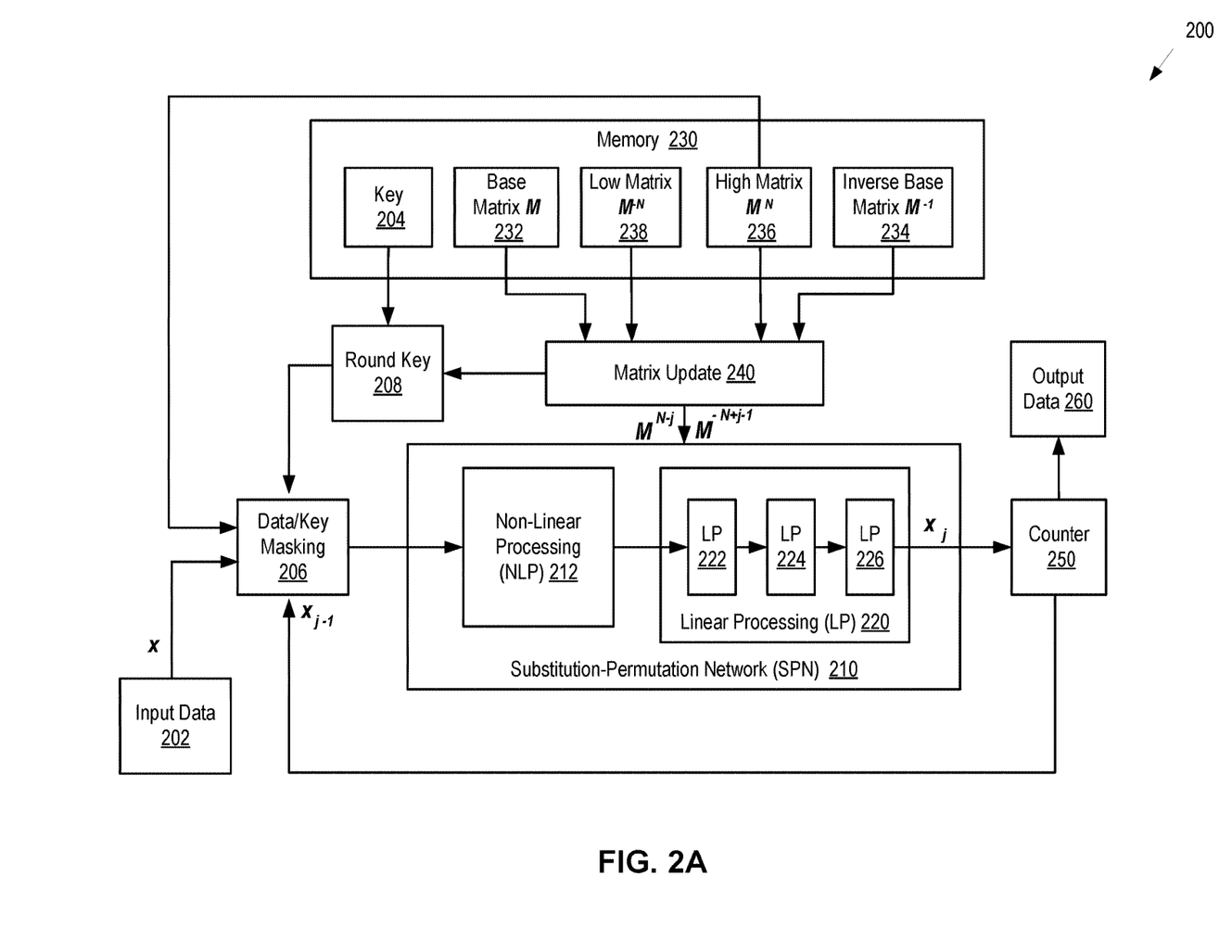
FIG. 2A is a block diagram illustrating example operations of a cryptographic substitution-permutation network (SPN) protected using round obfuscation, in accordance with some implementations of the present disclosure.

FIG. 2A is a block diagram illustrating example operations 200 of a cryptographic substitution-permutation network (SPN) protected using round obfuscation, in accordance with some implementations of the present disclosure. SPN 210 may include multiple computational stages, such as one or more non-linear processing (NLP) stages 212 and one or more linear processing (LP) stages 220. Although one NLP stage 212 and one LP stage 220 are depicted in FIG. 2A, SPN 210 may include any number of such stages being performed in an arbitrary order. Each of NLP stage 212 and LP stage 220 may perform any number of operations. For example, three linear operations LP 222, LP 224, and LP 226 are depicted in FIG. 2A. In some implementations, SPN 210 may be an AES network, where NLP 212 may be a substitution-box (S-Box), LP 222 may be a Shift Rows operation, LP 224 may be a Mix Column operation, and LP 226 may be an Add Round Key operation. In some implementations, SPN 210 may be implemented using one or more dedicated circuits, e.g., as part of a cryptographic engine (e.g., cryptographic engine 140 of FIG. 1), accelerator, co-processor, etc. In some implementations, SPN 210 may be implemented as one or more software modules executed by a general-purpose CPU (e.g., processor 120 of FIG. 1) or GPU. SPN 210 may operate on an input data 202 and produce output data 260. SPN 210 may have access to memory 230, which may be system memory 130 of FIG. 1 or any other memory (e.g., a set of registers of a cryptographic accelerator). Memory 230 may store key 204 and various auxiliary data, such information about specific obfuscation transforms to be used as described in more detail below.

In some implementations, obfuscation transforms may be affine linear transforms. For example, the set of transforms may be based on a matrix M. If a block of input data has a size of 128 bits (e.g., arranged into 4×4 table of elements of 8 bites each), matrix M may be a 128×128 matrix, e.g., a matrix over Galois Field (GF) GF(2). The transform may also be or include a multiplication by an element of $GF(2^{128})$, which may be an invertible element in $GF(2^{128})$. Below, for brevity and conciseness, various transforms are referred herein to as matrix M or, as a base matrix 232, but it should be understood that the implementations are not limited to matrices. Base matrix M 232 may be generated by a random number generator (not depicted in FIG. 2A) and stored in memory 230 for a certain number of encryption and/or decryption operations before being replaced with a new base matrix. In some implementations, obfuscation transforms $T_i$ for different rounds of SPN processing may be powers of the base matrix, M, $M^2$, ... $M^N$. The power $M^N$ of the base matrix is referred herein to as a high matrix 236. High matrix $M^N$ 236 may be precomputed and stored in memory 230 together with the base matrix 232. In some implementations, later rounds of processing by SPN 210 may be masked with decreasing powers $M^j$ of the base matrix M. More specifically, the high matrix $M^N$ 236 may be used as the first obfuscation transformation, $T_0 = M^N$, the matrix $T_1 = M^{N-1}$ may be used as the second obfuscation transformation, and so on, until the identity matrix $T_N = M^0$ is used in the last round of the SPN operations. In addition to base matrix M 232 and high matrix $M^N$ 236, memory 230 may further store inverse base matrix $M^{-1}$ 234 and low matrix $M^{-N}$ 238, as described in more detail below.

More specifically, input data x 202 may first be masked, at block 206, using high matrix $M^N$ 236, $$x_0 = M^N x$$

The masked data $x_0$ may be input into SPN 210 that performs the first round of cryptographic computations. Masking update stage 240 may receive (e.g., from memory 230) and provide the low matrix $M^{-N}$ 238 to SPN 210. The matrix update stage 240 may also compute the first round masking matrix $M^{N-1}$, e.g., by computing the product of the high matrix $M^N$ 236 and the inverse base matrix $M^{-1}$ 234. The first round masking matrix $M^{N-1}$ may then be provided to SPN 210 and also stored in the matrix update stage 240 (e.g., in a buffer or register) for use in the next round of computations. Using the provided low matrix $M^{-N}$ 238 and the first round masking matrix $M^{N-1}$, SPN 240 may perform a first round of modified (compared with a conventional SPN) computations to determine $x_1 = U_1 x_0$, where $U_1 = M^{N-1} \circ R_1 \circ M^{-N}$ is a composite operation that combines the unmasking transformation, the round computations, and the new masking transformation. For example, the composite operation may include an S-Box, Mix Columns, Shift Rows, and Add Round Key AES computations. As a result, during the first round, the SPN 210 operating in accordance with the aspects of this disclosure computes the following output $x_1 = M^{N-1} R_1 x$. Counter 250 may then determine that additional processing rounds are yet to be performed by SPN 210 and may return the output $x_1$ (as depicted by the bottom arrow) to the start of SPN 210, for the second round of processing.

During the second round, matrix update stage 240 may update and store the unmasking matrix by multiplying it by the base matrix $M^{-N+1} \to M^{-N+2} = M^{-N+1} M$ and may also update and store the masking matrix $M^{N-1} \to M^{N-2} = M^{N-1} M^{-1}$ using the inverse base matrix $M^{-1}$ 234. The second round masking matrix $M^{N-2}$ may be provided to SPN 210. Using the provided unmasking matrix $M^{-N}$ 238 and the second round masking matrix $M^{N-1}$, SPN 240 may perform a second round of modified (compared with a conventional SPN) computations to determine $x_2 = U_2 x_1$, where $U_2 = M^{N-2} \circ R_2 \circ M^{-N+1}$ is a composite operation of the second round. Accordingly, the output of the second round, $x_2 = M^{N-2} R_2 R_1 x$, represents the correct output of the first two rounds of SPN 210, masked by the matrix $M^{N-2}$ that is different from both the masking matrices used previously, $M^N$ and $M^{N-1}$.

Subsequent rounds of computations may be performed similarly. For example, during j-th round, matrix update stage 240 may update and store the unmasking matrix by multiplying it by the base matrix $M^{-N+j-1} \to M^{-N+j} = M^{-N+j-1} M$ and may also update and store the masking matrix $M^{N-j+1} \to M^{N-j} = M^{N-j+1} M^{-1}$. The j-th round masking matrix $M^{N-j+1}$ may be provided to SPN 210. Using the provided unmasking matrix $M^{-N+j}$ 238 and the j-th round masking matrix $M^{N-j+1}$, SPN 210 may perform j-th round of modified computations to determine $x_j = U_j x_{j-1}$, where $U_j = M^{N-j} \circ R_j \circ M^{-N+j-1}$ is a composite operation of j-th round. Accordingly, the output of j-th round, $x_j = M^{N-j} \Pi_{k=1}^{j} R_k x$, represents the correct output of the first j rounds of SPN 210, masked by the matrix $M^{N-j}$ that is different from the masking matrices used during previous j-1 rounds of computations.

After round j=N is completed, counter 250 may determine, e.g., using one or more comparators, that no additional rounds are to be performed and may output the final result of computations, $x_N = \Pi_{k=1}^{N} R_k x$, as output data 260. By construction, the N-th round masking matrix $M^{N-N}$ is the identity matrix. No additional masking needs to be performed on the output data $x_N$ since $x_N$ has a strong cryptographic protection derived from the full cycle of SPN 210 operations being performed. As a result of obfuscations described above, a fault injection that causes SPN 210 to stop operations after j rounds of computations, returns masked output $x_j = M^{N-j} \Pi_{k=1}^{j} R_k x$ that is significantly stronger protected against cryptanalysis than the unobfuscated output $\Pi_{k=1}^{j} R_k x$ of a conventional SPN.

In some implementations, round keys used during various rounds of SPN computations may be protected similarly. For example, in a conventional SPN, a round key $k_j$ for the j-th round (e.g., generated from key 204 using key expansion or other techniques) may be added, using modulo 2 (XOR) addition, to the input data into round j (output of round j-1) $x_{j-1} \to k_j \oplus x_{j-1}$. In an SPN that operates according to the disclosed implementations, a round key $k_j$ can be obfuscated using the same masking matrix as used for masking the output $x_{j-1}$ of the preceding round of SPN. For example, the round key for the j-th round may be multiplied by $M^{N-j+1}$ to obtain a masked round key $K_j = M^{N-j+1} k_j$ that is then added to data input $x_{j-1}$ to obtain masked input $X_{j-1} = K_j \oplus x_{j-1}$ into j-th round. As a result, both terms (data and key) in the XOR operation are homogeneously masked $X_{j-1} = M^{N-j+1} (k_j \oplus \Pi_{k=1}^{j-1} R_k x)$ using the same masking matrix $M^{N-j+1}$.

In some implementations, rounds of SPN data processing may be masked using transformations that are different from the transformation used for masking the round keys. For example, inputs into j-th round of SPN processing may be obfuscated with products of powers $M_1^{N-j+1} M_2^{N-j+1}$ of two different matrices $M_1$ and $M_2$ whereas keys into j-th round may be obfuscated using powers of one of these matrices, e.g., $M_2^{N-j+1}$. In one implementation, the input into j-th round is then obtained as follows. The previous j−1-th round of processing may have output $x_{j-1} = M_1^{N-j+1} M_2^{N-j+1} \Pi_{k=1}^{j-1} R_k x$. The output $x_{j-1}$ may be multiplied on the left by the matrix $M_1^{-N+j-1}$ to eliminate the first matrix: $M_1^{-N+j-1} x_{j-1} = M_2^{N-j+1} \Pi_{k=1}^{j-1} R_k x$. The round key for the j-th round $k_j$ may be multiplied by $M_2 N^{-j+1}$ to obtain the masked round key $K_j = M_2^{N-j+1} k_j$ that is added to the data input:

$$X_{j-1} = M_2^{N-j+1} k_j \oplus M_1^{-N+j-1} x_{j-1} = M_2^{N-j+1} k_j \oplus M_2^{N-j+1} \Pi_{k=1}^{j-1} R_k x,$$

and then used as an input into j-th round. As a result, both terms (data and key) in the XOR operation are homogeneously masked using the same masking matrix $M_2^{N-j+1}$.

In some implementations, each block (e.g., 128-bit block) of the input data 202 may be processed as described above, starting with the high matrix $M^N$ 236 and regressing towards the identity matrix $M^0$. The same high matrix may be used for multiple (e.g., sequential) blocks of the input data 202. In some cryptographic engines, further protections against fault injection attacks may be implemented. More specifically, an attacker that manages to fault an SPN into stopping consistently after j-th round may collect statistics about the same matrix $M^{N-j}$ that is used to mask intermediate outputs of j-th round and eventually determine the value of the matrix $M^{N-j}$. To prevent such attacks, the cryptographic engine may begin masking of each subsequent block with a high matrix $M^{LN}$ that is different from the high matrix $M^N$ used in masking of the previous block with L=2, 3 . . . . The base matrix for the subsequent block may be $M^L$ such that N multiplications by the inverse matrix $M^{-L}$ regress the masking matrix from $M^{LN}$ to $M^0$.

More specifically, during j-th round of SPN processing of the next input block of data y, the input into the j-th round (the output of the previous j−1-th round) may be $y_{j-1} = M^{L(N-j+1)} \circ \Pi_{k=1}^{j-1} R_k$ y. The matrix update stage 240 may provide masking matrix $M^{L(N-j)}$ and the unmasking matrix $M^{-L(N+j-1)}$ to SPN 210. Using the provided unmasking matrix, SPN 210 may perform j-th round of modified computations to determine $y_j = U_j y_{j-1}$, where $U_j = M^{L(N-j)} \circ R_j \circ M^{-L(N+j-1)}$. At the end of the N-th round, the output of SPN is the correct output $y_N = \Pi_{k=1}^N R_k$ y, e.g., a correct ciphertext corresponding to the plaintext y, as may be prescribed by the SPN specification or standard. In some implementations, the new high matrix $M^{LN}$, low matrix $M^{-LN}$, base matrix $M^L$, and inverse base matrix $M^{-L}$ may be pre-stored in memory 230.

In some implementations, the new high matrix $M^{LN}$, low matrix $M^{-LN}$, base matrix $M^L$, and inverse base matrix $M^{-L}$ may be computed during SPN processing of a preceding block of input data. Furthermore, the set of the new masking matrices $M^{LN}, M^{L(N-1)}, \ldots M^L$ may have no overlap with the previous set of the masking matrices $M^N, M^{N-1}, \ldots M$. In one example of L=N+1, the new masking matrices may be computed as follows. During the first round of SPN processing of input data x, matrix update stage 240 may compute the product of the high matrix $M^N$ 236 with itself, $M^N M^N$, and track the result as a new matrix $S_1 = M^{2N}$. At each subsequent round, the tracked matrix is updated with another multiplication by the high matrix $M^N$: $S_j = S_{j-1} M^N = M^{(j+1)N}$. After N rounds, the value stored is $S_N = M^{(N+1)N}$. This value is then used as the new high matrix 236 for processing of the next block of input data y. Similarly, starting from the base matrix M and multiplying by an additional matrix M at each round of processing of x, matrix update stage 240 may compute the new base matrix $M^{N+1}$ 232 for processing of the next block of input data y. The new low matrix $M^{-(N+1)N}$ 238 and the new inverse base matrix $M^{-N-1}$ 234 may be computed in a similar way. This process of generating the new set of masking matrices may be continued for each new block of input data 202. In some implementations, a fresh base matrix $\tilde{M}$ may be generated (e.g., using a random number generator) together with the values of the masking matrices (the high/low matrices and the inverse base matrix) and used for processing of a number of blocks of input data 202. The number of blocks may be a certain predetermined number of blocks, blocks processed within a particular time interval, blocks processed in relation to a particular task, application, client, and so on.

In some implementations, the base matrix M may be selected to have a particular form that speeds up matrix multiplications described above. For example, the base matrix M may be selected to be a circulant matrix over a certain field. Multiplication of circulant matrices may be performed faster than multiplication of general matrices, e.g., using Karatsuba multiplication algorithms, techniques of fast Fourier transforms, or other suitable methods. More specifically, and assuming 128-bit matrices that are selected to mask 128-bit chunks of input data, the base matrix M may be a circulant matrix over Galois Field GF(2), so that each row (column) of 128 one-bit elements is obtained by rotation of the preceding row (column) of one-bit elements. In some implementations, the base matrix M may be a circulant matrix over $GF(2^8)$, so that each row (column) of 16 eight-bit elements is obtained by rotation of the preceding row (column) of eight-bit elements. Similarly, various other Galois Fields $GF(2^n)$ may be used, e.g., where n=128, or some other number. For example, a randomly-selected field element of $GF(2^{128})$ may be chosen to form a row (or column) of the base matrix M and a circulant matrix may be formed using the field element, followed by an affine transformation. With this method, the formed base matrix M has a high probability of having a large order and being invertible. In some implementations, various other methods of choosing the base matrix M may be deployed, such as selecting a circulant matrix of the form $M_{ij} = f(i \oplus j)$, where $i \oplus j$ is a dyadic sum of i and j, obtained by an XOR (modulo 2) bitwise addition of the binary representations of i and j: $i \oplus j = \Sigma_k |m_k - n_k| 2^k$ of $i = \Sigma_k m_k 2^k$ and $j = \Sigma_k n_k 2^k$.

In some implementations, blocks of input data may be treated as elements of $GF(2^n)$ field, e.g., a 128-bit of input data may be treated as a corresponding element of $GF(2^{128})$. Similarly, round keys may also be treated as elements of $GF(2^n)$ with addition of round keys to data computed as addition operations with $GF(2^n)$. In such implementations, masking transforms may be reversible affine linear transforms that amount to multiplications (or divisions) by non-zero elements in $GF(2^n)$. More specifically, a non-zero base element L may be randomly selected in $GF(2^n)$ and a high element $L^N$, a low element $L^{-N}$, and an inverse base element $L^{-1}$ may be pre-computed and used in lieu of the corresponding matrices, as has been described above. Likewise, new base element $L^{N+1}$, new inverse base element $L^{-N-1}$, new high element $L^{(N+1)N}$, and new low element $L^{-(N+1)N}$ may be computed during processing of a given block of input data, as has been described above.

Figure 2B:
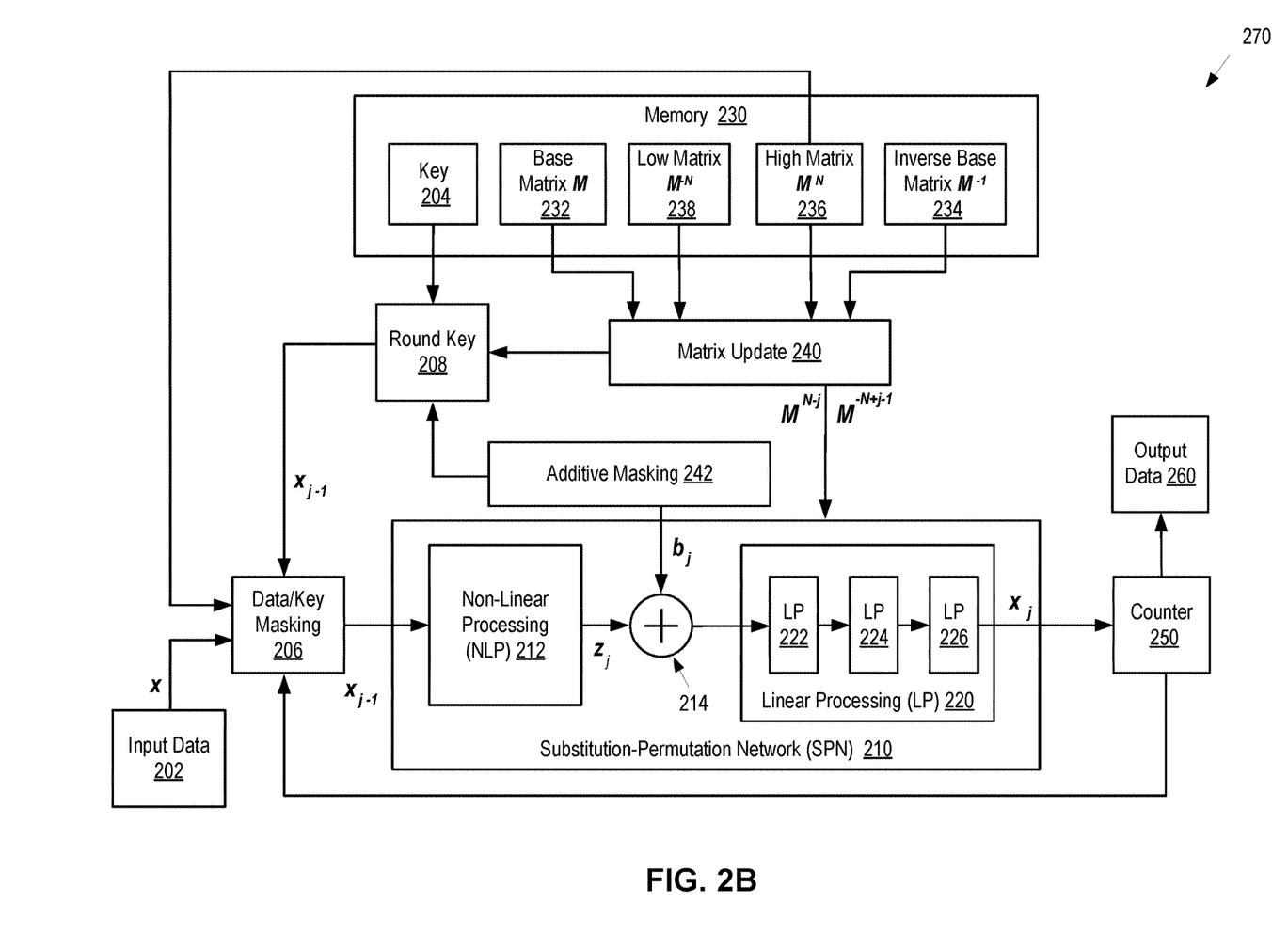
FIG. 2B is a block diagram illustrating example operations of a cryptographic substitution-permutation network (SPN) protected using both round obfuscation and additive masking, in accordance with some implementations of the present disclosure.

FIG. 2B is a block diagram illustrating example operations 270 of a cryptographic substitution-permutation network (SPN) protected using both round obfuscation and additive masking, in accordance with some implementations of the present disclosure. Additive masking 242 may perform a portion of operations 270. Additive masking 242 may have access to a set of masking vectors $b_1 \ldots b_N$ that can be added to intermediate outputs of SPN 210. Masking vectors $b_1 \ldots b_N$ may be generated by a pseudorandom generator, e.g., prior to processing of the input data x or in conjunction with a respective round of SPN processing. Each of masking vectors $b_1 \ldots b_N$ may have the same number of bits as the number of bits of the input data (e.g., 128 bits). In some implementations, masking vector $b_j$ may be added to an intermediate output $z_j$ of NLP 212 of j-th round of processing. For example, a bit-wise XOR gate 214 may be added to combinational logic that implements NLP stage 212 (e.g., an AES S-Box). The output of XOR gate 214, $z_j \oplus b_j$, may then be processed by LP stage 220 that outputs $x_j = l \cdot z_j \oplus l \cdot b_j$, where l denotes a matrix representing a combined set of operations of LP 220; e.g., in the absence of masking, the output of LP stage 220 would be $l \cdot z_j$. The modification of the output $x_j$ may be compensated before the NLP stage 220 of the next (j+1-th) round of SPN processing is performed. In one implementation, additive masking 242 may perform the compensation by modifying the round key $k_{j+1}$. More specifically, additive masking 242 may compute $l \cdot b_j$ and modify the round key as follows: $k_{j+1} \to k_{j+1} \oplus l \cdot b_j$. Consequently, when the round key is added to the input into j+1-th round, the input is returned to the correct value (which may still be multiplicatively masked, as described above): $(k_{j+1} \oplus l \cdot b_j) \oplus (l \cdot z_j \oplus l \cdot b_j) = k_{j+1} \oplus l \cdot z_j$. Although an XOR addition (modulo 2 addition) is used as an example, it should be understood that some other addition operation may be used in lieu of XOR gate 214, e.g., an ordinary addition (or an addition modulo a number other than 2). In such implementations, additive masking 242 may add to the round key $k_{j+1}$ some other number that compensates for the additive masking value $l \cdot b_j$ added to the intermediate output $z_j$.

Although in the example above, masking vectors are added after NLP 212 and prior to LP 220, is some implementations, masking vectors $b_j$ may be added after operations of LP 220, e.g., between LP 222 and LP 224 or between LP 224 and LP 226. In such implementations, matrix l should be understood as denoting a set of linear operations of a given round that are performed after adding masking vectors $b_j$ (and, correspondingly, the operations whose effect is compensated by modifying the round key $k_{j+1}$ of the next round).

In some implementations, the masking vectors $b_1 \ldots b_N$ may be selected in a way that makes the last masking vector zero, $b_N = 0$. This ensures that no compensation is needed for the output of the last round of SPN processing $x_N$. This may be achieved, as an example, by the additive masking 242 first selecting (or randomly generating) a set of intermediate vectors $a_1 \ldots a_N$ and computing the masking vectors by applying XOR addition to the intermediate vectors:

$$b_j = a_j \oplus a_N.$$

In some implementations, additive masking 242 may perform updating of masking vectors $b_1 \ldots b_N$ for use in processing of the subsequent input data y. The updating may be performed similarly to the way in which masking matrices are updated for use in processing of the subsequent inputs. For example, during (or in connection with) j-th round of processing, the additive masking 242 may compute a product of an update matrix N and the corresponding masking vector, $c_j = Nb_j$ and store the resulting vector $c_j$ as part of the set of masking vectors for processing of the next block of input data y. The update matrix N may be any one of the base matrix 232, inverse base matrix 234, high matrix 236, low matrix 238, or any combination thereof, or any other matrix.

Figure 3:
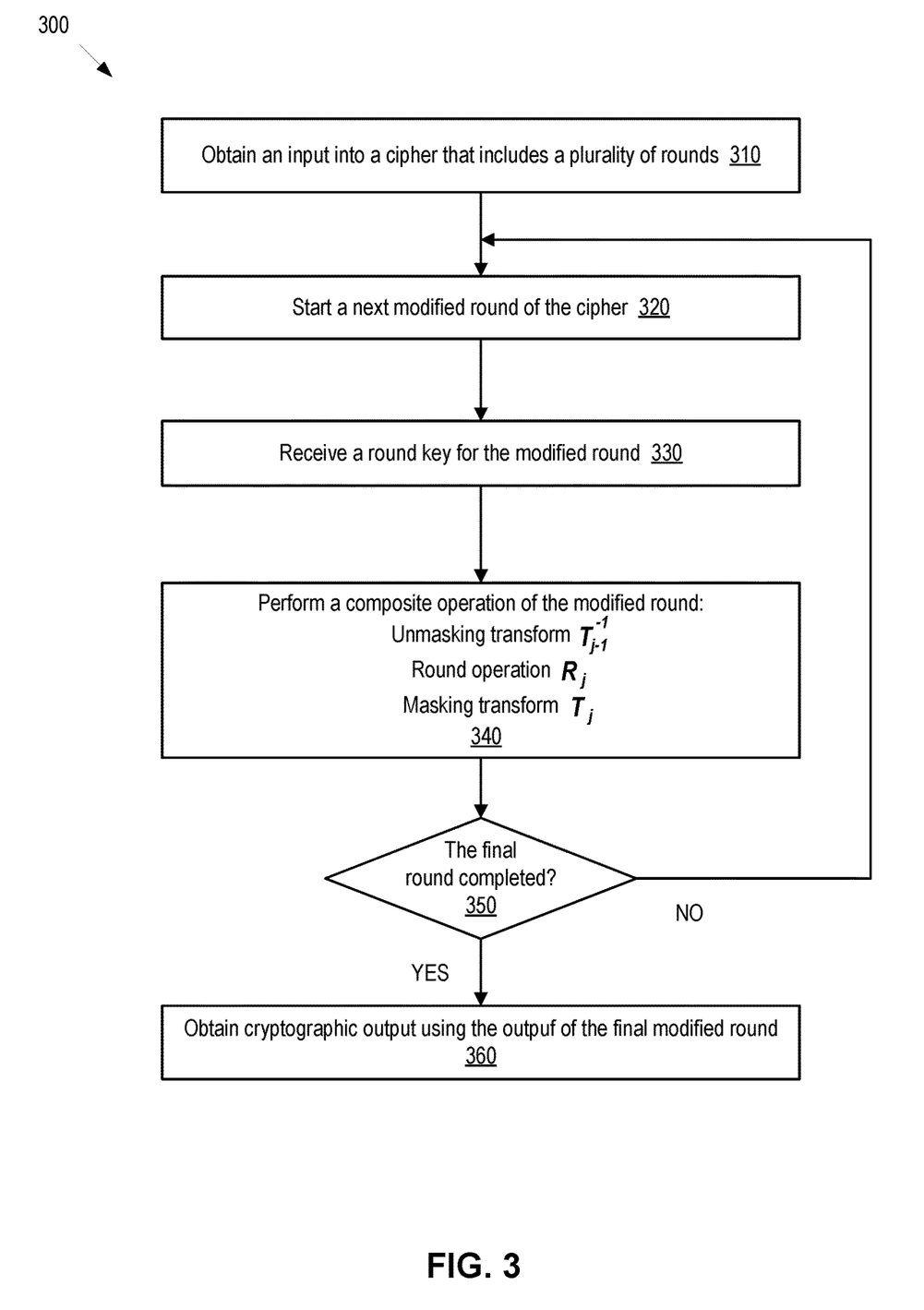
FIG. 3 is a flow diagram depicting method of protecting a cipher using masking transformations of round operations of the cipher, in accordance with one or more aspects of the present disclosure.
Figure 4:
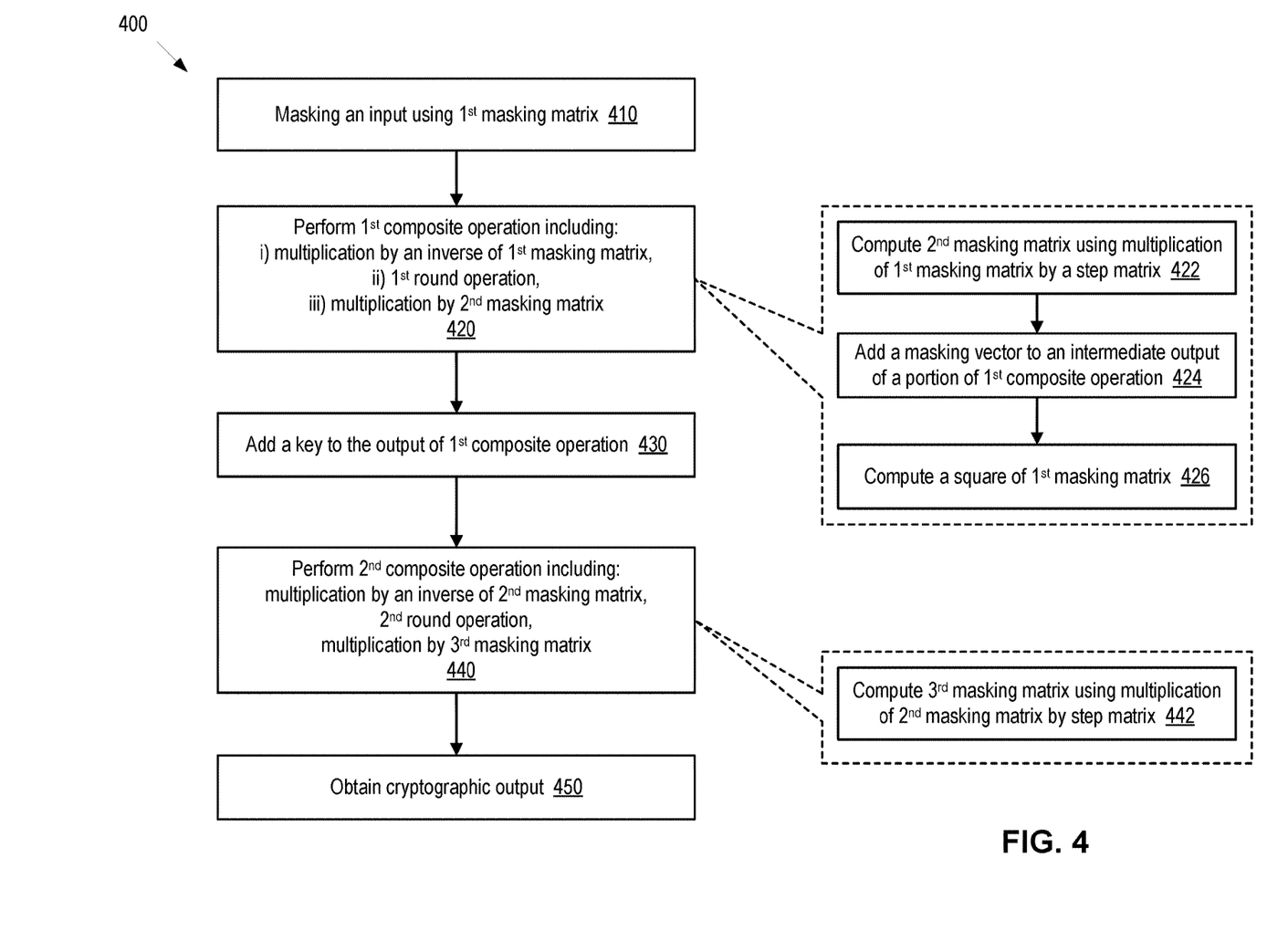
FIG. 4 is a flow diagram depicting method of protecting cipher operations using linear masking, in accordance with one or more aspects of the present disclosure.

FIG. 3 and FIG. 4 are flow diagrams depicting illustrative methods 300 and 400 of protecting cryptographic algorithms (ciphers) using round obfuscation in accordance with one or more aspects of the present disclosure. Methods 300 and 400 and/or each of their individual functions, routines, subroutines, or operations may be performed by a cryptographic processor (accelerator), such as cryptographic engine 140 depicted in FIG. 1 or a general-purpose processor (such as processor 120 in FIG. 1). Various blocks of methods 300 and 400 may be performed in a different order compared with the order shown in FIG. 3 and FIG. 4. Some operations may be performed concurrently with other operations. Some blocks may be optional. Methods 300 and 400 may be implemented as part of a cryptographic operation, e.g., an operation that utilizes symmetric key cryptography. The cryptographic operation may include AES algorithm or any other suitable SPN algorithm. Similarly, the cryptographic operation may include any operation that involves multiple rounds of computations. In some implementations, at least some operations of methods 300 and 400 may be performed by multiple (e.g., parallel) threads, each thread executing one or more individual functions, routines, subroutines, or operations of the method. In some implementations, processing threads implementing methods 300 and 400 may be synchronized (e.g., using semaphores, critical sections, and/or other thread synchronization mechanisms). Alternatively, threads implementing methods 300 and 400 may be executed asynchronously with respect to each other. Various operations of methods 300 and 400 may be performed in a different order compared with the order shown in FIG. 3 and FIG. 4. Some operations of methods 300 and 400 may be performed concurrently with other operations. In some implementations, one or more operations shown in FIG. 3 and FIG. 4 are not performed.

FIG. 3 is a flow diagram depicting method 300 of protecting a cipher using masking transformations of round operations of the cipher, in accordance with one or more aspects of the present disclosure. In some implementations, the cipher comprises a substitution-permutation network. Cipher computations protected with method 300 may include an encryption operation (e.g., encrypting a plaintext to obtain a ciphertext) or a decryption operation (e.g., decrypting a ciphertext to obtain a plaintext). The cipher may include a plurality of rounds (enumerated with j=1 ... N), each round performing a respective round operation $R_j$, which may be the same (e.g., $R_1 = R_2$) or different (e.g., $R_3 \ne R_4$) operations. Each round operation $R_j$ may include one or more linear operations and one or more non-linear operations.

At block 310, a processing device performing method 300 may obtain an input into the cipher, e.g., a 128-bit block of input data, a 256-bit block of input data, or any other number of bits of input data x. The input data may be processed using a plurality of modified round operations with a correct output $x_N = \Pi_{k=1}^{N} R_k \, x$ produced by the cipher but with intermediate round outputs $x_j = \Pi_{k=1}^{j} R_k \, x$ (with $j \ne N$) being obfuscated with various masking transforms. In some implementations, the input data x may be masked with an initial masking transform, e.g., $T_0$.

At block 320, method may continue with the processing device starting a first round (e.g., j=1) of the operations of the cipher (or any of the subsequent j>1 round, if previous rounds have been completed). At block 330, the processing device may obtain a round key $k_j$ for the current round of operations, e.g., by a key expansion of a master cryptographic key. In some implementations, the round key may be masked as described above in connection with FIG. 2A and/or FIG. 2B. At block 340, the processing device performs a composite operation of the current modified round of the cipher. The composite operation of j-th modified round, e.g., $x_j = T_j \circ R_j \circ T_{j-1}^{-1} x_{j-1}$, may include (but need not be limited to): i) an unmasking transform $T_{j-1}^{-1}$, ii) a round operation $R_j$ of the respective round, and iii) a masking transform $T_j$. The unmasking transform $T_{j-1}^{-1}$ may be an inverse of the masking transform $T_{j-1}$ of a previous (e.g., j−1-th) modified round of the cipher. In some implementations, the masking and unmasking transforms may be non-linear invertible transforms. In some implementations, the masking transform of a first modified round of the plurality of modified rounds is different from the masking transform of a second modified round of the plurality of modified rounds, $T_1 \neq T_2$. In some implementations, all masking transforms $T_j$ are different from each other. In some implementations, the masking transform of the final modified round may be an identity transform, $T_N = 1$, such that the output of the final modified round represents the correct cryptographic output of the cipher, $x_j = \Pi_{k=1}^{j} R_k \, x$.

At block 350, a counter or a comparator may be used to determine whether the final round N has been completed. In the instances where a round j<N has been completed, method 300 may continue with the processing device staring the next modified round, at block 320. For example, after the first modified round (j=1) has been performed, the processing device may start the second modified round (j=2). An input into a second modified round may be based on i) an output of the first modified round $x_1$ and ii) a key for the second modified round $k_2$. For example, the input into the second modified round may be a combination $k_2 \oplus x_1$. In some implementations, the key $k_2$ can be masked using the masking transform of the first modified round (e.g., the same masking transform $T_2$ that has been used to mask the output of the first modified round).

If it is determined that the round j=N has been completed, method 300 may continue to block 360, where the processing device obtains the cryptographic output using an output of a final modified round $x_N$ of the plurality of modified rounds. For example, in those implementations where the final masking transform is the identity transform, the processing device may retrieve the output of the final modified round, as this output coincides with the target cryptographic output (e.g., a ciphertext or a plaintext). In some implementations, where the final masking transform is not the identity transform $T_N \neq 1$, the processing device may additionally perform an inverse transformation to obtain the cryptographic output, $T_N^{-1}(x_N)$, using the output $x_N$ of the final modified round.

FIG. 4 is a flow diagram depicting method 400 of protecting cipher operations using linear masking, in accordance with one or more aspects of the present disclosure. The cipher may be an SPN cipher, or any other suitable cipher, and may include a plurality of rounds, each associated with a respective operation $R_j$. The cipher may produce, based on the input x, a first cryptographic output, e.g., $x_N = \Pi_{k=1}^{N} R_k \, x$. More specifically, at block 410, a processing device performing method 400 may mask the input into the cipher x using a first masking matrix, e.g., high matrix $M^N$ 236.

At block 420, method 400 may continue with the processing device performing a first composite operation. In some implementations, the first composite operation, e.g., $U_1 = M^{N-1} R_1 M^{-N}$, may include: i) a multiplication by an inverse $M^{-N}$ of the first masking matrix $M^N$, ii) an operation of a first round $R_1$ of a plurality of rounds of the cipher, and iii) a multiplication by a second masking matrix, e.g., $M^{N-1}$. In some implementations, as depicted with the top callout portion in FIG. 4, a number of operations may be performed in relation to the first composite operation. For example, as depicted with block 422, the processing device may compute the second masking matrix $M^{N-1}$ using multiplication of the first masking matrix $M^N$ by a step matrix $M^{-1}$: $M^{N-1} = M^N \cdot M^{-1}$. In some implementations, prior to performing of the first composite operation, a key $k_1$ may be added to the input x. The added key may also be masked with the first masking matrix. In some implementations, as depicted with block 424, method 400 may include adding a masking vector, e.g., vector $b_1$, to an intermediate output of a portion of the first composite operation, e.g., to an output of a non-linear portion of the first composite operation. In some implementations, the processing device performing method 400 may also compute a square of the first masking matrix, $M^{2N}$, e.g., to start a process of building masking matrices for a subsequent input into the cipher.

The output of the first composite operation may then be used to obtain the first cryptographic output $x_N$ based on an output $x_1 = M^{N-1} R_1 x$. Obtaining the first cryptographic output $x_N$ may involve further round operations. For example, at block 430, method 400 may continue with adding a key $k_2$ (e.g., a round key obtained for a second round of the cipher) to the output of the first composite operation to obtain an input $k_2 \oplus x_1$ into a second composite operation. In some implementations, the key $k_2$ is masked by the second masking matrix $M^{N-1}$. In some implementations, the key $k_2$ is modified in view of the masking vector $b_1$ to ensure that the masking vectors in the two addends of the sum $k_2 \oplus x_1$ compensate each other.

At block 440, method 400 may continue with the processing device performing a second composite operation. In some implementations, the second composite operation, e.g., $U_2 = M^{N-2} \circ R_2 \circ M^{-N+1}$, May Include: i) a Multiplication by an Inverse $M^{-N+1}$ of the Second masking matrix $M^{N-1}$, ii) an operation of a second round $R_2$ of a plurality of rounds of the cipher, and iii) a multiplication by a third masking matrix, e.g., $M^{N-2}$. In some implementations, as depicted with the bottom callout portion in FIG. 4, a number of operations may further be performed in relation to the second composite operation. For example, as shown by block 442, the processing device may compute the third masking matrix $M^{N-2}$ using multiplication of the first masking matrix $M^{N-1}$ by the step matrix $M^{-1}$: $M^{N-2} = M^{N-1} \cdot M^{-1}$. In some implementations, method 400 may include adding a masking vector, e.g., vector $b_2$ to an intermediate output of a portion of the second composite operation. In some implementations, the processing device performing method 400 may also compute a cube of the first masking matrix, $M^{3N}$ (e.g., by computing the product of $M^{2N}$ and the first masking matrix $M^N$), to continue the process of building masking matrices for a subsequent block of input data.

In some implementations, masking of the intermediate outputs and masking of round keys may be performed using the same matrices. For example, the output $x_1$ of the first composite operation may be masked with the second masking matrix $M^{N-1}$ and the round key for the second round of the cipher $k_2$ may be masked with the same second masking matrix $M^{N-1}$. In some implementations, masking of the intermediate outputs and masking of round keys may be performed using different matrices. For example, the key masking matrix for the round key $k_2$ may be $M_2^{N-1}$ while the output of the first composite operation may be masked by the second masking matrix, e.g., $M_1^{N-1} \cdot M_2^{N-1}$, that is different from $M_2^{N-1}$. Correspondingly, prior to performing the second composite operation, the processing device may multiply the input $x_1$ into the second composite operation by an inverse matrix of a product of the second masking matrix $(M_1^{N-1} \cdot M_2^{N-1})$ and the key masking matrix $(M_2^{N-1})$: $x_1 \rightarrow M_2^{N-1} \cdot (M_1^{N-1} \cdot M_2^{N-1})^{-1} x_1$.

At block 450, the output of the second composite operation may be used to obtain the first cryptographic output $x_N$ based on the output of the second composite operation $x_2 = M^{N-2} R_2 R_1 x$. Obtaining the first cryptographic output $x_N$ may involve further round operations, similar to the first and the second composite operations described in conjunction with blocks 420-440. In some implementations, at least one of the plurality of composite operations includes a multiplication by a masking matrix (e.g., matrix M) that is an inverse of the step matrix (e.g., matrix M). In some implementations, this happens in the penultimate (N−1-th) composite operation.

In some implementations, the first masking matrix $M^N$ was obtained during determination of a second cryptographic output of the cipher, the second cryptographic output determined before the first cryptographic output. Similarly, the first masking matrix for determination of a third (subsequent) cryptographic output, e.g., $M^{(N+1)N}$, may be obtained as indicate above (cf. block 426), e.g., by computing the next power of the first masking matrix $M^N$ in conjunction with each round of the cipher.

Figure 5:
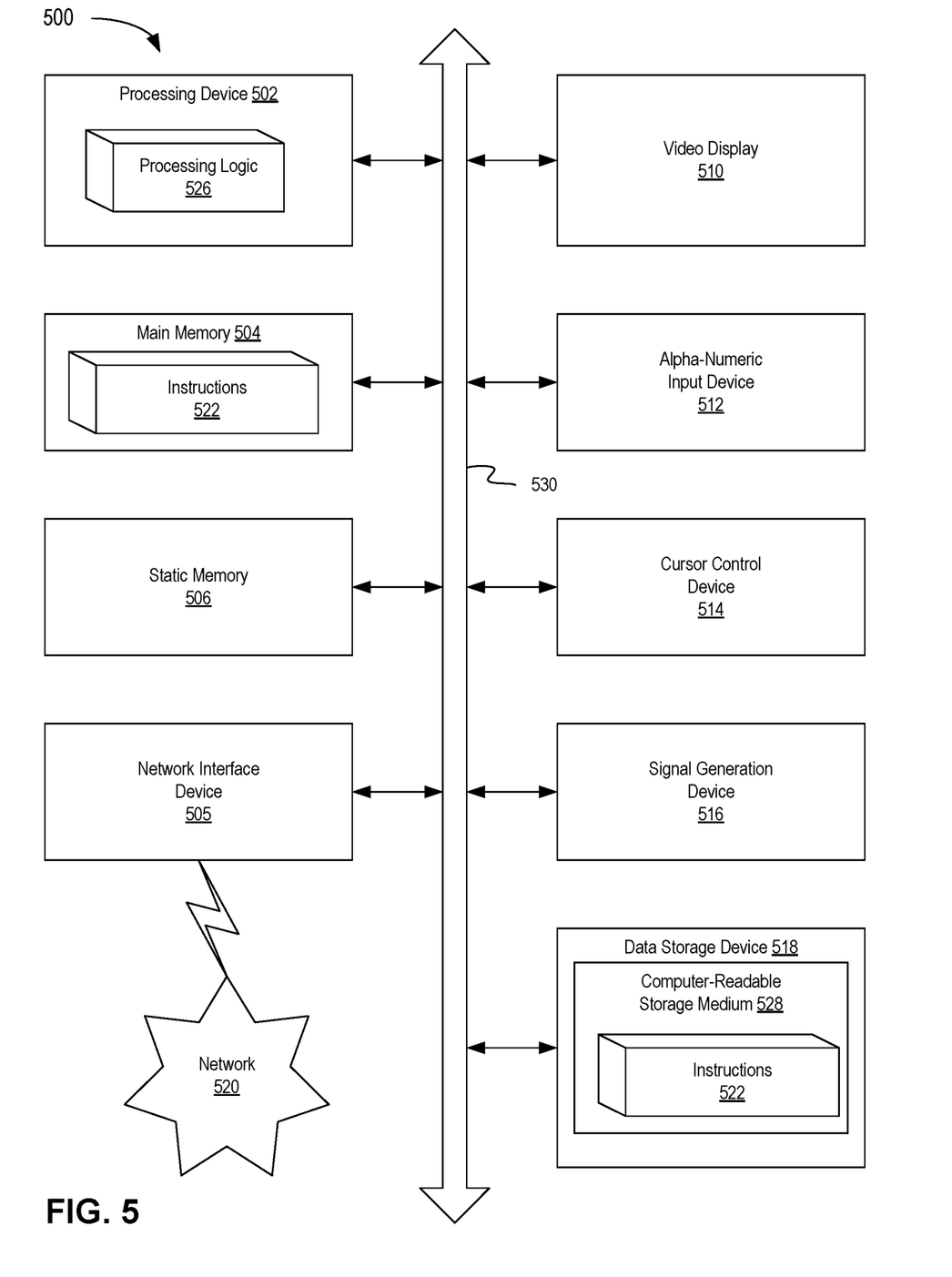
FIG. 5 depicts a block diagram of an example computer system operating in accordance with one or more aspects of the present disclosure.

FIG. 5 depicts a block diagram of an example computer system 500 operating in accordance with one or more aspects of the present disclosure. In various illustrative examples, example computer system 500 may be computer system 102, illustrated in FIG. 1. Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 300 of protecting a cipher using masking transformations of round operations of the cipher and method 400 of protecting cipher operations using linear masking.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions implementing method 300 of protecting a cipher using masking transformations of round operations of the cipher and method 400 of protecting cipher operations using linear masking.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to process an input into a substitution-permutation network (SPN) cipher, wherein the input into the SPN cipher comprises at least one of a plaintext input or a ciphertext input, the method comprising:
    selecting a plurality of masking transforms, each masking transform of the plurality of masking transforms associated with a respective round of a plurality of rounds of the SPN cipher;
    performing, by a processing device, a plurality of modified rounds of the SPN cipher, wherein each of the plurality of modified rounds computes a composite operation comprising:
        an unmasking transform,
        an operation of a respective round of the plurality of rounds of the SPN cipher, and
        a masking transform,
        wherein the unmasking transform comprises an inverse of the masking transform of a previous modified round of the plurality of modified rounds of the SPN cipher; and
    obtaining an output of the SPN cipher using an output of a final modified round of the plurality of modified rounds, wherein the output of the SPN cipher comprises at least one of a ciphertext output or a plaintext output.

2. The method of claim 1, wherein the masking transform of the final modified round comprises an identity transform.

3. The method of claim 1, wherein the masking transform of a first modified round of the plurality of modified rounds is different from the masking transform of a second modified round of the plurality of modified rounds.

4. The method of claim 1, wherein an input into a second modified round of the plurality of modified rounds is based on i) an output of a first modified round of the plurality of modified rounds and ii) a key for the second modified round masked using the masking transform of the first modified round.

5. The method of claim 1, wherein the masking transform is a linear affine transform.

6. The method of claim 5, wherein the linear affine transform comprises a multiplication or division by an element of Galois Field GF ($2^n$), wherein n is a number of bits of data input into each of the plurality of rounds of the cipher.

7. A method to determine a ciphertext output of a substitution-permutation network (SPN) cipher, the method comprising:
    masking, by a processing device, a plaintext input into the SPN cipher using a first masking matrix, wherein the first masking matrix comprises a first power of a base masking matrix;
    performing a first composite operation that comprises:
        a multiplication by an inverse of the first masking matrix,
        an operation of a first round of a plurality of rounds of the SPN cipher, and
        a multiplication by a second masking matrix, wherein the second masking matrix comprises a second power of the base masking matrix; and
    obtaining the ciphertext output of the SPN cipher based on an output of the first composite operation.

8. The method of claim 7, wherein obtaining the ciphertext output based on the output of the first composite operation further comprises:
    adding a key, obtained for a second round of a plurality of rounds of the cipher, to the output of the first composite operation to obtain an input into a second composite operation;
    performing the second composite operation that comprises:
        a multiplication by an inverse of the second masking matrix,
        an operation of a second round of the plurality of rounds of the cipher, and a multiplication by a third masking matrix different from the second masking matrix; and obtaining the ciphertext output based on an output of the second composite operation.

9. The method of claim 8, wherein the key is masked by the second masking matrix.

10. The method of claim 8, wherein the key is masked by a key masking matrix, the method further comprising:

prior to performing the second composite operation, multiplying the input into the second composite operation by an inverse matrix of a product of the second masking matrix and the key masking matrix.

11. The method of claim 8, wherein adding the key is performed using an XOR addition.

12. The method of claim 8, wherein performing the first composite operation comprises adding a masking vector to an intermediate output of a portion of the first composite operation, and wherein the key is modified in view of the masking vector.

13. The method of claim 8, further comprising:

computing the second masking matrix using multiplication of the first masking matrix by a step matrix; and computing the third masking matrix using multiplication of the second masking matrix by the step matrix.

14. The method of claim 13, further comprising:

performing a plurality of composite operations comprising the first composite operation and the second composite operation, wherein at least one of the plurality of composite operations comprises a multiplication by a masking matrix that is an inverse of the step matrix.

15. The method of claim 7, wherein an input into the first composite operation is masked by the first masking matrix.

16. The method of claim 7, wherein the first masking matrix was obtained during determination of a previous ciphertext output of the cipher, the previous ciphertext output of the cipher determined before the ciphertext output of the cipher.

17. The method of claim 7, further comprising computing a square of the first masking matrix.

18. A system comprising:

a memory device; and a processing device communicatively coupled to the memory device, wherein the processing device is configured to process an input into a substitution-permutation network (SPN) cipher, by performing operations comprising:

selecting a plurality of masking transforms, each masking transform of the plurality of masking transforms associated with a respective round of a plurality of rounds of the SPN cipher;

performing a plurality of modified rounds of the SPN cipher, wherein each of the plurality of modified rounds computes a composite operation comprising:

an unmasking transform, an operation of a respective round of the plurality of rounds of the SPN cipher, and a masking transform, wherein the unmasking transform comprises an inverse of the masking transform of a previous modified round of the plurality of modified rounds of the cipher; and obtaining an output of the SPN cipher using an output of a final modified round of the plurality of modified rounds, wherein the output of the SPN cipher comprises at least one of a ciphertext output or a plaintext output.

19. The system of claim 18, wherein the masking transform of the final modified round comprises an identity transform.

20. The system of claim 18, wherein the masking transform of a first modified round of the plurality of modified rounds is different from the masking transform of a second modified round of the plurality of modified rounds.

21. The system of claim 18, wherein an input into a second modified round of the plurality of modified rounds is based on i) an output of a first modified round of the plurality of modified rounds and ii) a key for the second modified round masked using the masking transform of the first modified round.

\* \* \* \* \*